United States Patent [19]

Croissant et al.

[11] 3,746,451
[45] July 17, 1973

[54] HIGHLY RELIABLE STRIP WIDTH GAUGE

[75] Inventors: Larry L. Croissant, Boulder; Edward A. Crowther, Lafayette, both of Colo.

[73] Assignee: International Business Machines Corporation, Armonk, N.Y.

[22] Filed: Nov. 26, 1971

[21] Appl. No.: 202,540

[52] U.S. Cl.............. 356/159, 356/199, 356/200, 250/217 SS, 250/219 WD
[51] Int. Cl. .......................................... G01b 11/04
[58] Field of Search.................. 356/159, 199, 200; 250/217 SS, 219 WD

[56] References Cited
UNITED STATES PATENTS

| | | | |
|---|---|---|---|
| 3,604,940 | 9/1971 | Matthews | 356/159 X |
| 3,659,950 | 5/1972 | Troll et al. | 356/199 |
| 2,641,960 | 6/1953 | Strother | 356/159 |

*Primary Examiner*—Ronald L. Wibert
*Assistant Examiner*—Paul K. Godwin
*Attorney*—Homer L. Knearl et al.

[57] ABSTRACT

The strip width gauge described herein is capable of measuring strips to an accuracy of 50 microinches. In particular, it is applied herein to measuring the width of magnetic tape. The measurements are accomplished by aligning, at each edge of the strip, a light emitting diode on one side of the strip and a photodiode on the other side of the strip. The amount of light reaching the photodiode from its associated light emitting diode will depend upon how much light is intercepted by the strip. The output from the two photodiodes is summed. By summing the outputs, the total is independent of lateral movement of the strip. Light emitting diodes are used so that they might be excited by a signal whose frequency is well above normal power line frequency. The higher frequency signal picked up at the photodiodes can then be either analyzed on an AC basis or rectified and analyzed on a DC basis. Additional photodiodes may be provided as reference photodiodes. The reference photodiodes monitor changes in light emission from the light emitting diodes. Their outputs are also summed, and a difference amplifier takes the difference between the edge-sensing photodiodes and the reference photodiodes.

7 Claims, 3 Drawing Figures

PATENTED JUL 17 1973
3,746,451

HIGHLY RELIABLE STRIP WIDTH GAUGE

BACKGROUND OF THE INVENTION

1. Field of the Invention

This invention relates to reliably and accurately detecting the width of strips. More particularly, the invention relates to detecting the strip width of magnetic tape; however, the invention is equally applicable to measurement of a strip whether it be metal, plastic, or any material that will block or deflect radiant energy. The invention has particular utility in a manufacturing line for strips wherein it is desirable to maintain highly accurate control of the width of the strip over an extended length of time.

2. Description of Prior Art

Strip width gauges in the past have largely been of two types — mechanical feelers or photoelectric cell detectors. The mechanical feelers were typically made up of a fixed edge guide on one side of the strip and a spring-loaded edge guide at the other edge of the strip. As the strip was moved between the two guides, the spring-loaded edge guide would move, and its physical movement could be monitored to detect variations in the width of the strip. Problems with this width gauge are (1) edge wear on the guides, (2) criticality of the spring tension versus tape tension so as to avoid buckling the tape between the two guides, and (3) friction between the tape and the guide bearing surface.

The strip width gauge using a photoelectric cell does not have the problems associated with the mechanical gauges but lacks reliability due to variations in the components involved and dark current drift in the system in general. The concept of using photoelectric cells at each edge of the strip and summing the output from the cells to detect changes in width is well known. However, because the systems are low frequency systems, they generally have problems with background illumination and dark current drift.

It is the primary object of this invention to obtain a highly accurate strip width gauge and, at the same time, a very reliable, low-maintenance gauge.

SUMMARY OF THE INVENTION

In accordance with this invention, the above object has been accomplished by edge detecting each edge of a strip with a combination of light emitting diodes and photodiodes and exciting the light emitting diodes with a frequency well above 60 Hz (normal power line frequency). The output of the photodiodes is summed, and variations in width may be detected by monitoring the peak amplitude in each cycle of the signal picked up from the photodiodes or by rectifying the AC signal from the diodes and monitoring the level of the rectified signal. In effect the width of the tape modulates the AC radiant energy passing from the light emitting diodes to the photodiodes. To avoid problems of voltage drift, the high frequency signal from the photodiodes is AC-coupled to the detection circuitry.

Reference photodiodes are provided to monitor the light emitting diodes so as to detect variations in light emitted by the diodes. This reference signal from each reference photodiode is summed and AC-coupled to the detection circuitry. The difference is then taken between signals from the reference and the edge photodiodes so as to eliminate any noise or light power variations due to the light emitting diodes. Also, by taking the difference between the reference and edge signals, the sensitivity of the detector is increased.

If the detecting system is monitoring the amplitude of each peak in the AC signal, a balancing network is provided prior to taking the difference between the signals so as to adjust out any difference due to amplitude and phase shifts caused by the components in the system.

The advantages of our invention are several. The greatest advantages are stability and reliability. The stability is largely due to (1) the use of reference photodiodes to track light power variations and (2) the AC excitation of the diodes and the AC coupling to prevent the effects of dark current drift in photodiodes from getting to the detection circuitry. Further, the gauge is not susceptible to noise due to background light because it operates at frequencies well above the normal power line frequency. Finally, the detection circuitry lends itself to integrated circuit manufacture and thus can be highly reliable in and of itself.

The foregoing and other features and advantages of the invention will be apparent from the following more particular description of preferred embodiments of the invention as illustrated in the accompanying drawings.

DESCRIPTION OF PREFERRED EMBODIMENTS

Figure 1:
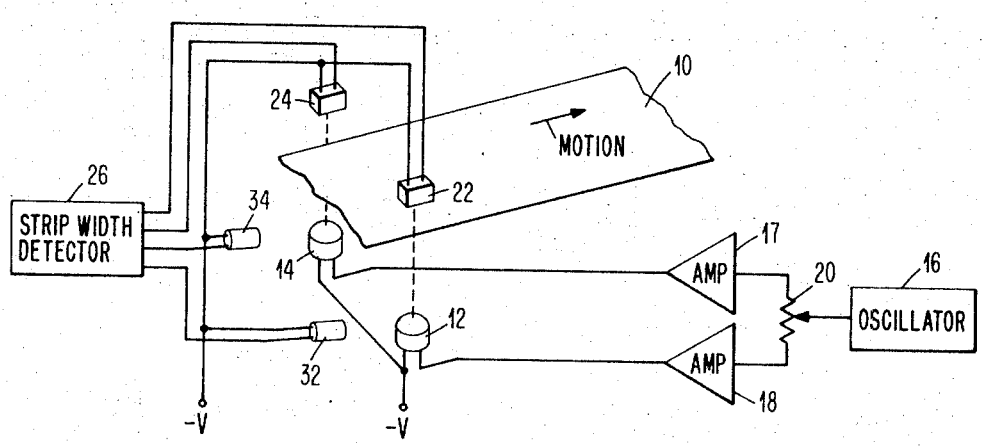
FIG. 1 shows one preferred embodiment of the invention and illustrates the relative position of the optical components of the system.

Referring now to FIG. 1, the schematic layout of the total gauging system is shown. Magnetic tape 10 moves from left to right. The width of the tape 10 is monitored by the combination of a photodiode and light emitting diode at each edge of the tape 10. Light emitting diodes 12 and 14 illuminate each edge of tape 10 and are excited by an AC signal supplied from oscillator 16 through amplifiers 17 and 18. The potentiometer 20 provides a means whereby the balance between power applied to light emitting diodes 12 and 14 can be adjusted to balance the light indicated as received by photodiodes 22 and 24. This adjustment is discussed in more detail hereinafter with regard to calibration of the gauge.

Photodiodes 22 and 24 are positioned opposite light emitting diodes 12 and 14 respectively. Photodiode 22 and its associated light emitting diode 12 are positioned so that for normal tape width, the edge of the tape 10 will block or cover approximately half of the light sensitive surface of photodiode 22. As depicted in FIG. 1, the shape of the photodiodes 22 and 24 is rectangular. These diodes present a target of approximately 100 mils by 200 mils to the light from their associated light emitting diodes. The long dimension of the rectangular target is aligned with the edge of the tape 10. Of course, the shape of the photodiodes could be circular or elliptical or any other shape. Also, the amount of photosensitive area can be adjusted to any desired value.

The AC signal from the photodiodes has the same frequency as the AC signal driving the light emitting diodes and is passed to the strip width detector 26. The strip width detector 26 will be discussed in more detail with regard to FIGS. 2 and 3.

Before leaving FIG. 1, note that photodiodes 32 and 34 are schematically represented in FIG. 1 as monitoring the light from light emitting diodes 12 and 14, respectively. Photodiodes 32 and 34 are the reference photodiodes previously referred to in the Summary of the Invention. They are provided for the purpose of eliminating the light power variations of the light emitting diodes.

Mounted at the top of the light emitting diodes 12 and 14 are lenses. These lenses tend to direct most of the light emitted from the diodes to their associated photodiodes. Reference photodiodes 32 and 34 would have to be in a position to pick up light from light emitting diodes 12 and 14. The output from the reference photodiodes 32 and 34 is passed to the strip width detector 26.

Figure 2:
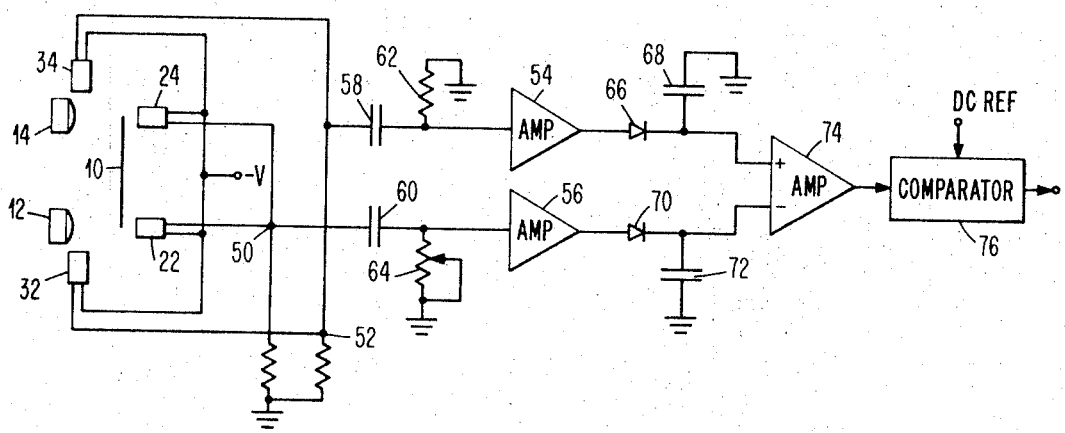
FIG. 2 shows one preferred embodiment for the strip width detector of FIG. 1 wherein the AC signals from the photodiodes are rectified and, thereafter, monitored to detect the strip width.
Figure 3:
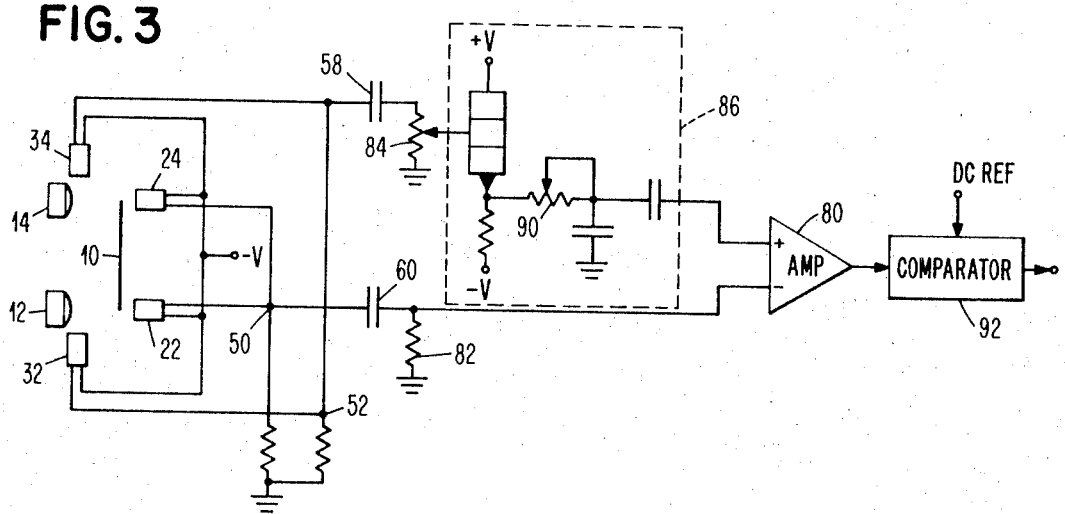
FIG. 3 shows another preferred embodiment for the strip width detector of FIG. 1 wherein the amplitude of each peak in the AC signal is monitored to detect the strip width.

As shown in FIGS. 2 and 3, the reference photodiodes 32 and 34 are placed to the side of, and slightly to the front of, light emitting diodes 12 and 14. Even though most of the light is directed forward from diodes 12 and 14 to photodiodes 22 and 24, diffused light is emitted out the side of the lenses mounted on diodes 12 and 14. Reference photodiodes 32 and 34 pick up this diffused light from the side of the lenses.

To simplify balancing the signals from photodiodes 22 and 24 and reference photodiodes 32 and 34 as discussed hereinafter, it is best to position diodes 24 and 34 and diodes 22 and 32 on the same constant intensity curve for the light emitting diodes used. Constant intensity curves for light emitting diodes are available from the light emitting diode manufacturers. As an example, the light emitting diodes could be the Models ME2, ME2A, ME5 or ME5A, available from the Monsanto Corporation.

In FIG. 2, the position of the photodiodes, the light emitting diodes, and the tape are schematically represented along with one preferred embodiment of the strip width detector. FIG. 2 is the preferred embodiment wherein the AC signal from the edge photodiodes 22 and 24 and the AC signal from the reference photodiodes 32 and 34 are AC-coupled to the detector. In the detector, the AC signals are rectified to produce a DC level with low frequency variations reflecting strip width variations.

The output from the edge photodiodes 22 and 24 is summed at node 50, while the output from the reference photodiodes 32 and 34 is summed at node 52. The sum at node 50 will be hereinafter referred to as the width signal, and the sum at node 52 will be hereinafter referred to as the reference signal.

The reference and width signals are AC-coupled to amplifiers 54 and 56, respectively, via coupling capacitors 58 and 60, respectively. The function of the coupling capacitors 58 and 60 is to prevent any signal due to DC current drift in either the photodiodes or the light emitting diodes from reaching amplifiers 54 and 56. Resistors 62 and 64 provide the voltage drop which is the input to amplifiers 54 and 56. Further, resistor 64 is a potentiometer so that it may be adjusted to balance the width signal against the reference signal during calibration of the gauge so as to completely eliminate any difference in amplitude between the signals due to slight differences in the components in the detection circuitry and due to slight differences in light intensity detected by photodiodes because of their different positions. The differences due to circuit components should be almost negligible if the detection circuits are implemented with integrated circuits.

The reference signal amplified by amplifier 54 is rectified by diode 66 in combination with capacitor 68. Similarly, the width signal amplified by amplifier 56 is rectified by diode 70 in combination with capacitor 72. Difference amplifier 74 then substracts the width signal from the reference signal to produce a low frequency or essentially DC signal whose level varies with the width of the tape 10.

The absolute width signal out of difference amplifier 74 may be used to detect out-of-tolerance conditions as shown by the comparator 76. Comparator 76 compares the absolute width signal against a DC reference or a threshold level. Each time the width exceeds the reference or threshold level, the comparator 76 will have an output indicating tape 10 is out of tolerance. Notice that the absolute width signal is effectively a change-in-width signal relative to a normal width. Therefore, by comparing this absolute width signal against a DC reference, an out-of-tolerance condition, whether too narrow or too wide, can be detected.

Instead of being applied to a comparator, the absolute width signal from amplifier 74 can be recorded or otherwise displayed to give a history of strip width as the tape 10 moves past the gauge position. For example, the signal from amplifier 74 can be applied directly to a strip chart recorder.

When the gauging apparatus of FIG. 1 is used with a detector, as in FIG. 2, the oscillator 16 drives the light emitting diodes 12 and 14 at a frequency of 20 KHz. Accordingly, amplifiers 17 and 18 in FIG. 1 and amplifiers 54 and 56 in FIG. 2 should have a narrow pass band that includes 20 KHz. With this narrow pass band, the amplifiers will pass the reference signal and the width signal due to AC excitation by oscillator 16, but the amplifiers will not pass background noise caused by normal room illumination (60 Hz). Amplifier 74, on the other hand, may be a low frequency amplifier from, say, 0 to 1 KHz as the signal applied to its input is the rectified reference and width signals.

To calibrate the gauge represented by the combination of FIGS. 1 and 2, first a shim of normal strip width is fixed in position between the edge-detecting photodiodes. With the shim in position, potentiometer 64 in FIG. 2 is adjusted until a null condition exists at the output of amplifier 74. The shim is moved laterally to different positions, and potentiometer 20 is adjusted so that, irrespective of the lateral position of the shim, there will be no change in the output from amplifier 74 in FIG. 2. This adjustment of potentiometer 20 takes care of any tracking errors caused by lateral movement of a strip whose width is to be measured. Adjustment of potentiometer 20 may destroy the amplifier 74's null output previously obtained by adjustment of potentiometer 64. Therefore, potentiometer 64 is readjusted to again null the output signal from amplifier 74.

The above adjustments have nulled the absolute width signal from amplifier 74 for a normal width strip. The calibration is completed by inserting shims of various widths between the edge photodiodes and noting the output of the absolute width signal from amplifier 74. Generally, only three or four additional shims are necessary over the range of measurement desired since the absolute width signal varies linearly with width.

As previously mentioned in the introduction, lateral movement of the tape 10 has no effect as the outputs from photodiodes 22 and 24 are summed. Thus, any lateral movement of the tape will cause an increase in the output from one photodiode and a corresponding decrease in the output from the other photodiode. Thus, any change in the signal from the summed photodiodes 22 and 24 will represent a change in width only.

With the gauge calibrated, the strip width detection may proceed. As the strip is passed between the photodiodes as shown in FIG. 1, the absolute width signal out of amplifier 74 in FIG. 2 would be passed to a comparator 76 to detect out-of-tolerance conditions. The apparatus in FIGS. 1 and 2 may easily detect a change in width of 1 mil. The width of the strip or tape being worked with is of no consequence.

The sensitivity of the gauge to rapid changes in tape width is largely controlled by the size of the edge detecting photodiodes 22 and 24. In the preferred embodiment, the photodiodes monitor approximately a 200 mil length of the tape, while the tape speed is approximately 100 inches per second. At this tape speed and for this size diode, maximum frequency of change in the width signal expected would be 500 Hz.

With regard to width sensitivity, the system may easily detect changes of 1 mil and is stable within 50 microinches and has short term resolution of approximately 10 microinches. In the preferred embodiment, with 100 mil wide photodiodes for each edge, a change of 1 percent in the level of the voltage from amplifier 74 in the detector of FIG. 2 corresponds to approximately a 1 mil change in width for tape 10. This sensitivity is enhanced by subtracting off the reference from the width signal. The differences amplifier 74 then amplifies only the signal of interest (width variation) and does not amplify distortions in the AC signal that drives the diodes.

It will be apparent to one skilled in the art they any number of component changes and circuit configuration changes might be made and still maintain the benefits of photodiodes driven at predetermined frequencies with AC-coupling to their detector, whereby the high accuracy strip width measurement is reliably obtained. One example of an alternative configuration is shown in FIG. 3.

Common elements in FIGS. 1, 2 and 3 have been given the same reference numerals. In the FIG. 3 embodiment, difference amplifier 80 operates directly with the AC reference signal from node 52 and the AC width signal from node 50 to detect strip width based upon the amplitude of each peak in the width signal.

The width signal at node 50 is applied to the difference amplifier 80 via the AC coupling capacitor 60 and resistor 82. The reference AC signal is applied to the difference amplifier 80 via coupling capacitor 58, potentiometer 84, and phase balancing circuit 86.

Amplifier 80 is now amplifying the difference between the two AC signals — width and reference. Therefore, for accurate reading, it is absolutely necessary that the two inputs to the amplifier 80 be balanced in phase and amplitude at time of calibration. The balancing is accomplished by adjusting potentiometer 84 to correct for amplitude imbalance and then adjusting potentiometer 90 inside the phase balancing circuit 86 to adjust the phase of the signal passed from node 52 to the positive input of the amplifier 80. Calibration is again accomplished by inserting a shim in place of the tape and adjusting potentiometers 84 and 90, just as potentiometer 64 in FIG. 2 was adjusted, until a null voltage appears at the output of amplifier 80. With the gauge calibrated, tape may be measured by passing it between the light emitting diodes and the photodiodes and monitoring the peak amplitude of each peak of the AC signal from amplifier 80. If this type of detection is used, the frequency of the oscillator 16 in FIG. 1 might more desirably be around 2 KHz so as to reduce the effects of phase shift between reference and width signals due to capacitance of components before the signals reach amplifier 80.

The absolute AC width signal out of amplifier 80 can be monitored by a comparator 92 with a DC reference threshold so that each time a peak in the amplitude signal from amplifier 80 exceeds the threshold, the comparator 92 will generate an output pulse.

While the invention has been particularly shown and described with reference to preferred embodiments thereof, it will be understood by those skilled in the art that various changes in form and detail may be made therein without departing from the spirit and scope of the invention.

What is claimed is:

1. Apparatus for measuring the width of a strip comprising:

means for illuminating each edge of the strip with radiant energy of a frequency other than the frequency of the background illumination;

photodetecting means positioned adjacent each edge of the strip for generating an edge signal indicative of the portion of radiant energy permitted to reach each photodetecting means by the adjacent edge of the strip;

summing means responsive to the edge signal from said photodetecting means at each edge of the strip for summing the two edge signals whereby a width signal is generated;

width detecting means for detecting variations in the width signal and thereby variations in the width of the strip;

coupling means responsive to said summing means for limited frequency coupling of the width signal to said width detecting means whereby only widthsignal frequency components representative of radiant energy from said illuminating means are coupled to said width detecting means;

second photodetecting means positioned adjacent said illuminating means for generating a reference signal proportional to the radiant energy emitted by said illuminating means;

second coupling means responsive to said second photodetecting means for limited frequency coupling of the reference signal to said width detecting means whereby only reference-signal frequency components representative of radiant energy from said illuminating means are coupled to said width detecting means;

difference amplifying means in said width detecting means for taking the difference between the width signal and the reference signal whereby the reliability and sensitivity of the width measurement is enhanced.

2. The apparatus of claim 1 and, in addition:

balance adjustment means in said width detecting means for adjusting the amplitude and phase of the reference signal relative to the width signal so that for normal strip width said difference amplifying means will have a null output.

3. The apparatus of claim 1 and, in addition:
rectifying means in said width detecting means for rectifying the width signal and the reference signal before they are applied to said difference amplifying means whereby the output of said difference amplifying means is substantially a DC level having low frequency variations reflecting variations in strip width.

4. Apparatus for gauging the width of magnetic tape comprising:
a pair of light emitting diodes;
a photodiode associated with each light emitting diode and positioned on the opposite side of the tape from its associated light emitting diode for generating an edge signal based upon the intensity of the light reaching the photodiode from its associated light emitting diode;
an AC signal source for driving said light emitting diodes so that they emit light that varies in intensity at a frequency different from the background illumination of the tape;
means for directing the light from each light emitting diode past the edge of the tape to its associated diode whereby the amount of light reaching each photodiode is indicative of the position of the edge of the tape;
means for summing the edge signals from the pair of photidiodes to thereby produce a width signal;
means responsive to said summing means for filtering the width signal so that it contains frequency components which are substantially only the frequency of said AC source;
means responsive to a filtered width signal for detecting variations in the width of the tape from variations in the amplitude of the filtered width signal;
a reference photodiode associated with each light emitting diode for generating a signal whose amplitude is proportional to the light emitted from its associated light emitting diode;

second means for summing the signals from the pair of reference photodiodes to thereby produce a reference signal;
second filtering means responsive to said second summing means for filtering the reference signal whereby the frequency components of the reference signal are substantially only the frequency of said AC source;
means responsive to said filtered reference signal and said filtered width signal for subtracting the two signals to produce an absolute filtered width signal for passage to said detecting means.

5. The apparatus of claim 4 and, in addition:
means for adjusting the amplitude and phase of the filtered reference signal relative to the filtered width signal prior to the application of both signals to said subtracting means.

6. The apparatus of claim 4 and, in addition:
means for converting the filtered reference signal and the filtered width signal into substantially DC signals before application to said subtracting means.

7. Method for measuring the width of strips with radiant energy of a frequency other than the frequency of background illumination, said radiant energy being produced by radiant energy source and being monitored by radiant energy detector, said method comprising the steps of:
modulating the radiant energy with variations in the strip width by positioning the strip to partially block the radiant energy path from the radiant energy source to the radiant energy detector;
filtering the modulated radiant energy signal from the detector so that the filtered signal does not contain frequency components due to radiant energy from sources other than the radiant energy source;
monitoring the radiant energy emitted from the radiant energy source and thereby generating a reference signal;
subtracting the reference signal from the modulated filtered signal whereby only the modulation of the filtered signal remains and is indicative of the width of the strip.

* * * * *